UNITED STATES PATENT OFFICE.

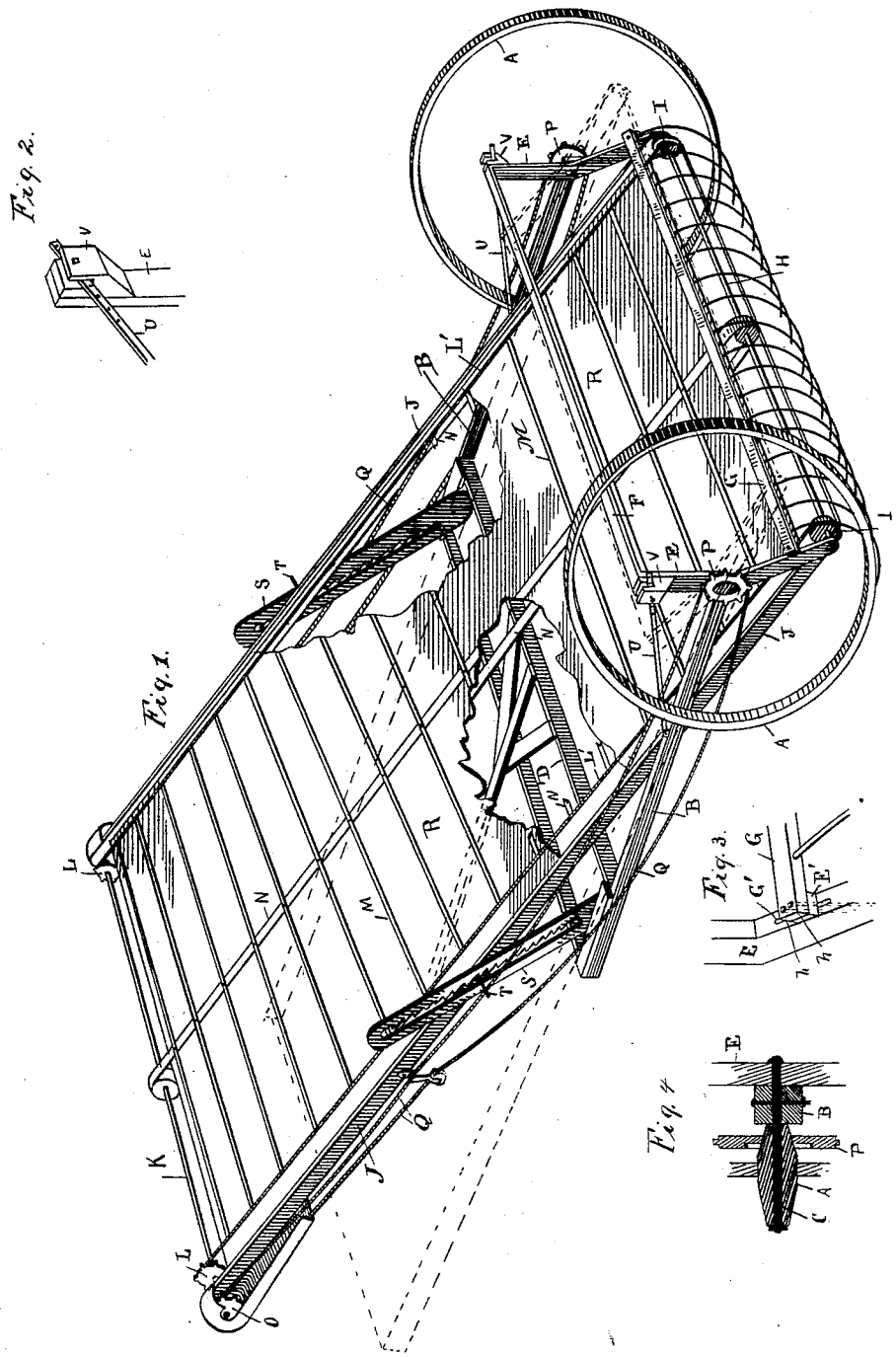

PIERRE D. MILLER AND WILLIAM N. DE VAULT, OF PEORIA, ILLINOIS.

HAY-LOADER.

SPECIFICATION forming part of Letters Patent No. 480,269, dated August 9, 1892.

Application filed January 30, 1892. Serial No. 419,755. (No model.)

*To all whom it may concern:*

Be it known that we, PIERRE D. MILLER and WILLIAM N. DE VAULT, citizens of the United States, residing at Peoria, in the county of Peoria and State of Illinois, have invented certain new and useful Improvements in Hay-Loaders; and we do hereby declare the following to be a full, clear, and exact description of the invention, such as will enable others skilled in the art to which it appertains to make and use the same.

This invention relates to improvements in hay-loaders of that class which are mounted on wheels and designed to be placed behind a wagon for loading directly from the ground while in motion.

The object of the invention is that the elevating portion of the loader may be raised or lowered at the will of the person on the wagon to the height of the load, and, furthermore, that the rake used on this machine may be raised clear of the ground in transportation.

In the drawings hereto annexed, Figure 1 represents a perspective view of the loader, showing rake down, and the elevating portion partly raised; and Fig. 2 represents a perspective view of a portion of the rake-arm and a rod used in connection therewith, to be hereinafter described. Fig. 3 is a perspective view of a rake-head, showing the means for adjustment. Fig. 4 is a view of a portion of one of the carrying-wheels as mounted on its axle and showing the axle in its position in main frame.

A A represent the carrying-wheels, which revolve on the axles C, Fig. 4, said axles passing through the side beams B of the main frame and securely held therein. The main frame is composed of the parallel side beams B B, which are supported by the wheels A and axles C, as shown, and of the forward cross-pieces D, placed at right angles to said beams B, as shown, and bolted thereto. The inner ends of each of the axles C C are extended sufficiently to support a bent arm E, as shown, Fig. 1. The upper extremities of these arms E are surmounted by a cross-piece F, while near the lower extremities of said arms E is bolted a second cross-piece G, which serves as a rake-head and also for strengthening purposes. The said rake-head G is mounted on a block E', which is secured to the said arm E by a slot G' and bolts $h\ h$. Thus perfect adjustment of the rake is attained. Now journaled in the extreme lower ends of the arms E is a shaft H, as shown, which carries near either end a flanged wheel I, the purpose of which will presently be shown. The axles C C form pivots for the arms E when folding the machine for transportation. Pivoted near each end of the shaft H and just inside of the arms E is a beam J, which extends forward of the machine for some distance, and in the extreme forward ends of said beams J is journaled a shaft K, and near either end of said shaft, inside of the beams J, is secured a sprocket-wheel L, which wheels are exactly in line with the wheels I on shaft H, and over the wheels I and L run sprocket-chains carrying on every sixth or eighth link a lug, to which are bolted the slats M used in such elevating portions. Also situated at the middle of the length of each of the two shafts K and H is a face-wheel, as shown, over which runs a belt N. The slats M are also secured to the belt by means of rivets or the like. This mechanism is driven by means of the sprocket-wheels O on either end of shaft K, which derive their movement from sprocket-chains Q and sprocket-wheels P, secured to the hubs of each of the carrying-wheels A.

The elevating-frame is provided with a bottom R, on which the slats M slide while the machine is in operation, and the elevator is supported by toothed rack-supports S, which are pivoted at their lower extremities to the main frame B, and in each of the beams J of the elevator is inserted a rod T, which rests in the notches cut in the supports S. A rod U is pivoted to the main frame B, as shown, while its free end, which is flat, rests in a slotted block V, secured to the upper extremities of the arms E, and, as shown in Fig. 2, the end of the said rod is provided with holes for adjustment, into which a pin is inserted through the block V.

The operation of the machine may be understood from the following: The main frame is attached to the wagon in the usual manner and the elevator is raised to the height of the load and the toothed rack falls into place, thus engaging the teeth of same with the pins T on the elevator-beams J, while the rake-arms E are placed in the position shown, with the rods U in place, as seen in Fig. 1, and the machine is in working order. By the revolving of the carrying-wheels the chains Q are moved, and thus operating elevator-gearing, and as the rake gathers up the hay the elevator at once takes it up to the wagon. When it is desired to transport the machine from one place to another, the elevator may be lowered till it rests on the forward beams D of the frame B, and the rods U may be lifted out of the blocks V and the rake swung on its pivots (i. e., the axles C C) by carrying the arms E forward and down, as shown in dotted lines, and this movement will elevate the rake from the ground.

One of the good features of this constructed loader is that the elevator may be raised or lowered at will from the load without altering the position of the lower end of the elevator or the rake for the simple reason that the elevator is entirely independent of the rest of the machine, except at its lower end, where it swings on the shaft H.

We claim—

1. In a hay-loader, the bent arms E E, pivoted at or near the middle of their length on the axles C C, the upper extremities of said arms being surmounted by the cross-piece F, and near the lower extremities of which arms is adjustably secured by bolts or the like the rake-head G, substantially as set forth and described.

2. In a hay-loader, the bent arms E E, pivoted at or near the center of their length on the axles C C and carrying between their upper extremities the cross-piece F for the purposes set forth and also carrying the slotted blocks V and carrying between their lower extremities the shaft H, said extremities being provided with the adjustable rake-head G and pivotally supporting the lower end of said elevating-frame in the manner and for the purposes set forth, in combination with the main frame pivoted on the said axles C C and comprising the side beams B B and cross-pieces D D, said frame being provided with the notched supports S S, substantially in the manner and for the purposes set forth and described.

3. In a hay-loader, the bent arms E E, pivoted at or near the center of their length on the axles C C, the upper extremities of said arms being surmounted by the cross-piece F and slotted blocks V, and near the lower extremity of which arms is adjustably secured by bolts or the like the rake-head G, and the rods U, pivoted on the main frame composed of the side beams B B and cross-pieces D D, in combination with an elevating mechanism of the form herein set forth and described.

In testimony whereof we affix our signatures in presence of two witnesses.

PIERRE D MILLER.
WILLIAM N. DE VAULT.

Witnesses:
EUGENE REESLER,
ARTHUR KEITHLEY.